T. S. COLLINS & H. SENSEMAN.
Improvement in Bee Hives.
No. 120,858. Patented Nov. 14, 1871.
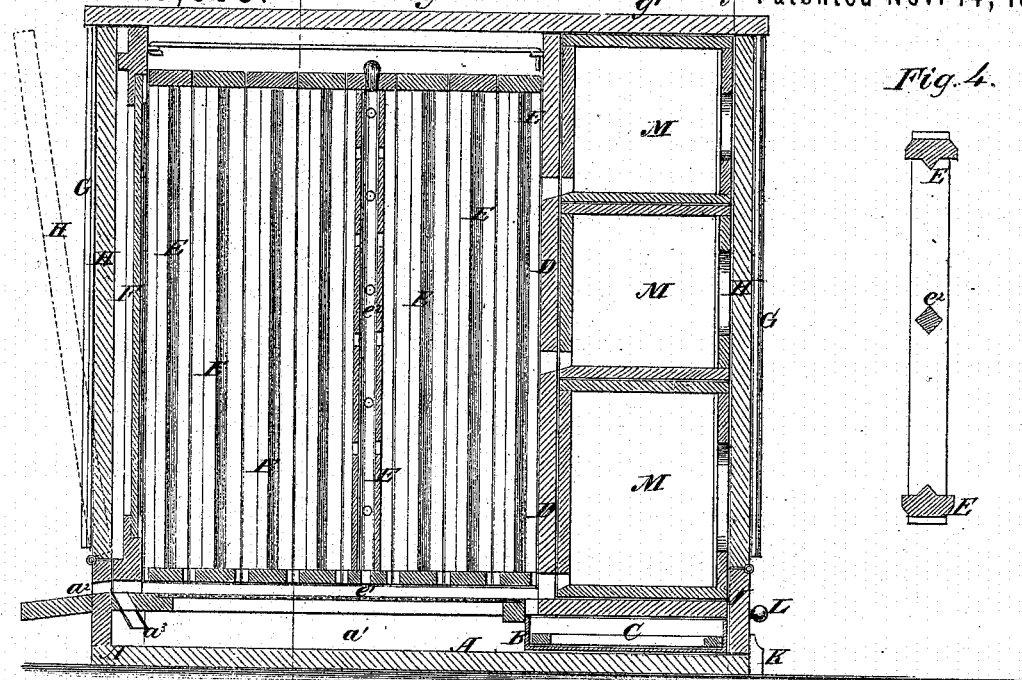
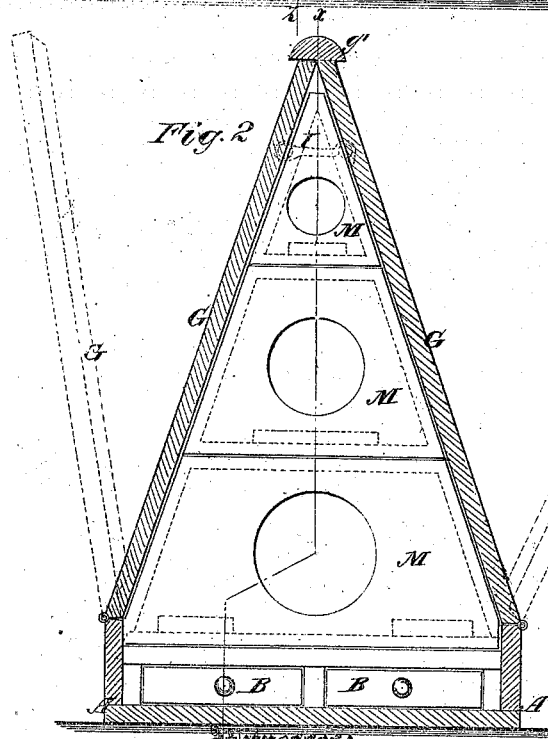
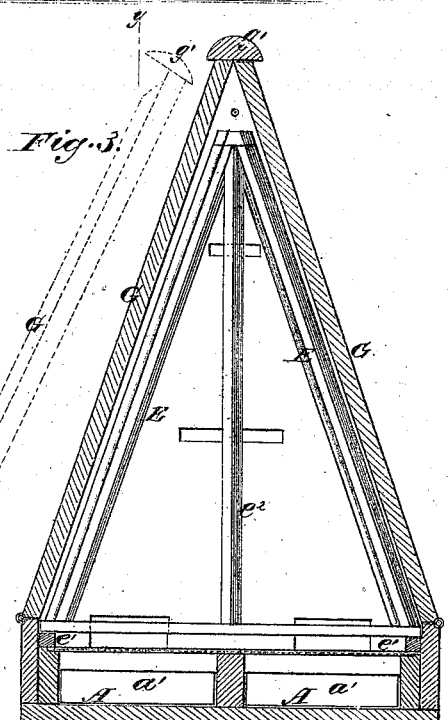

＃120,858

UNITED STATES PATENT OFFICE.

TANDY S. COLLINS AND HIRAM SENSEMAN, OF TREMONT, OHIO.

IMPROVEMENT IN BEE-HIVES.

Specification forming part of Letters Patent No. 120,858, dated November 14, 1871.

*To all whom it may concern:*

Be it known that we, TANDY S. COLLINS and HIRAM SENSEMAN, of Tremont, in the county of Clark and State of Ohio, have invented a new and useful Improvement in Gothic or Angular Bee-Hives; and we do hereby declare that the following is a full, clear, and exact description thereof, which will enable others skilled in the art to make and use the same, reference being had to the accompanying drawing forming a part of this specification, in which—

Figure 1 is a detail vertical longitudinal section of our improved bee-hive taken through the line $x\ x$, Fig. 2. Fig. 2 is a detail vertical cross-section taken through the line $y\ y$, Fig. 1. Fig. 3 is a detail vertical cross-section of the same taken through the line $z\ z$, Fig. 1. Fig. 4 is a detail cross-section of one of the comb-frames.

Similar letters of reference indicate corresponding parts.

Our invention consists in the improvement of bee-hives, as hereinafter fully described and subsequently pointed out in the claims.

A is the base of the hive, which is made with a double bottom, thus forming a chamber, $a'$, to receive the droppings of the bees, and to serve as a moth-trap. The upper wall of the chamber $a'$ is cut away and replaced by wire-gauze. In the upper wall of the chamber $a^1$, just in front the entrance $a^2$, is formed a slit or slot in which is placed a tube, $a^3$, the upper end of which is flush with the upper surface of the said wall or floor and the lower end of which projects below the said wall, so that the moth can easily pass down through the said tube but cannot pass up through it. B are the feed-boxes or drawers, which are placed in the rear part of the base A, and have floating racks or frames C placed in them which float upon the feed and prevent the bees from getting into their feed and being drowned. The bees have access to their feed-drawers B through a slot or opening in the top wall of the base A, just in front of the stationary partition D that separates the honey-boxes and comb-frames. E are the comb-frames, which are made in the form of isosceles triangles, the ends of the base of which rest upon cleats $e'$ attached to the top wall of the base A, so as to leave a space between the bottoms of the frames and the said base to allow the bees to pass freely beneath all the frames. The bases of the frames E are made narrower than their sides, so that the bees can pass up freely between the comb-frames. The comb-frames E are strengthened by a vertical post, $e^2$, which may be made hollow, and with its sides perforated and a hole leading to it from the top and bottom of the frame, which top opening may be closed with a plug or cork when not required for use. This construction enables the hive to be conveniently and thoroughly ventilated when required. The outer corners of the adjacent side edges of the frames E are beveled off, as shown in Fig. 3, to avoid the danger of killing many of the bees when inserting the frames, while at the same time completely shutting off the cold-air chamber surrounding the frames from the inner chamber in which are the bees and honey. The frames E may be reversed or exchanged, as may be desired or convenient. F is the front partition, which is made in the same form as the comb-frames E, and the middle part of which is a glass plate to allow the interior of the frames E to be conveniently seen. To the upper edges of the sides and ends of the base A are hinged the lower edges of the two sides G and two ends, H, so that all four of said parts may be turned down at the same time. The front and rear end edges of the two sides G project a little beyond the ends H, and have cleats attached to them which rest against the outer sides of the edges of the said ends H. The two sides are secured to each other by two hooks, I, one at each end, which hooks are attached to one of said sides and hook into eyes attached to the other of said sides. The rear end J of the base A, to which the rear end H is hinged, is movable, being secured in place by a button, K, and provided with a knob or handle, L. By this construction, by turning the strip J out, the end H will slip down, freeing its edges from the cleats of the sides G, allowing the said rear end to be detached for the convenient inspection of the honey-boxes M. The honey-boxes M are placed one above the other in the space between the stationary partition D and the rear end H. The honey-boxes M have glass plates set in their outer or rear sides, and slots formed in their forward or inner sides corresponding in position with similar slots formed in the stationary partition D, so that the bees can pass into and out of each honey-box from the interior of the comb-frames. To the upper edge of one of the sides G is attached a cap, $g'$, that overlaps the upper edge of the other side to guard against the entrance of water. For ventilating purposes holes may be formed in the upper part of the ends, which holes should be covered with wire-gauze.

Having thus described our invention, what we claim as new, and desire to secure by Letters Patent, is—

1. In combination with triangular pieces H H two rectangular pieces, G, edge-flanged, having cap $g$ thereon, hinged to base A, and folding together at an angle on top, as described, to admit of thorough protection from the weather by its form, easy access by its unfolding on every side, and of being conveniently fastened by one pair of hooks and eyes.

2. The combination, with flanged sides G and sides H, held by said flanges, of base A having the end J removable, as specified, to enable one side H to be removed, as set forth.

3. The triangular comb-frame E, provided with a central guide, $e^2$, substantially as herein shown and described.

4. The central guide $e^2$ of the comb-frames E, made hollow and with lateral top and bottom openings, substantially as herein shown and described, and for the purpose set forth.

5. The arrangement of the rear-hinged end H and detachable end board J of the base A, in connection with the base A, sides G $g'$, and honey-boxes M, substantially as herein shown and described, and for the purpose set forth.

TANDY S. COLLINS.
HIRAM SENSEMAN.

Witnesses:
D. H. THOMAS,
JOHN H. BLOSE.   (7)